United States Patent
Johansson

(10) Patent No.: US 8,447,866 B2
(45) Date of Patent: May 21, 2013

(54) NETWORK NODES THAT ESTABLISH SESSIONS USING EXISTING CONNECTIONS IDENTIFIED IN A CENTRAL DATABASE

(75) Inventor: Tore Johansson, Karlskrona (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 229 days.

(21) Appl. No.: 12/916,877

(22) Filed: Nov. 1, 2010

(65) Prior Publication Data

US 2012/0110191 A1    May 3, 2012

(51) Int. Cl.
*G06F 15/16*    (2006.01)
(52) U.S. Cl.
USPC ............................................. 709/227
(58) Field of Classification Search
USPC ............................................. 709/227
See application file for complete search history.

(56) References Cited

U.S. PATENT DOCUMENTS

| | | | |
|---|---|---|---|
| 7,859,560 B1* | 12/2010 | Issa | 348/14.01 |
| 2012/0063300 A1* | 3/2012 | Sahin et al. | 370/225 |
| 2012/0117235 A1* | 5/2012 | Castro Castro et al. | 709/224 |

FOREIGN PATENT DOCUMENTS

EP    1 271 911 A1    1/2003

OTHER PUBLICATIONS

International Search Report, PCT Application No. PCT/SE2011/051126, Mar. 15 2012, 5 pages
Written Opinion of the International Searching Authority, PCT Application No. PCT/SE2011/051126, Mar. 15 2012, 5 pages.
RFC 2782: "A DNS RR for specifying the location of services (DNS SRV)", Feb. 2000; whole document.
RFC 2915: "The Naming Authority Pointer (NAPTR) DNS Resource Record", Sep. 2000; whole document.
RFC 4006: "Diameter Credit-Control Application", Aug. 2005; whole document.

* cited by examiner

*Primary Examiner* — Yves Dalencourt
(74) *Attorney, Agent, or Firm* — Myers Bigel Sibley & Sajovec, P.A.

(57) ABSTRACT

Network nodes can add information to a central database that identifies their connections to other network nodes. The central database can thereby serve as a repository of information indicating connections between network nodes. When a first network node needs to establish a session to a second network node, it can interrogate the central database to learn what existing connections, if any, can be used for the session. When existing connections provide more than one available pathway between the first and second network nodes, the first network node may select among the existing connections in response to quality of service values that are provided by the central database for those connections.

23 Claims, 14 Drawing Sheets

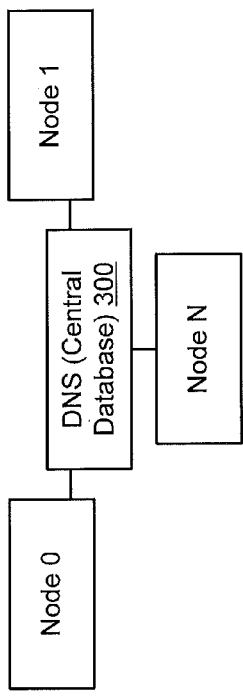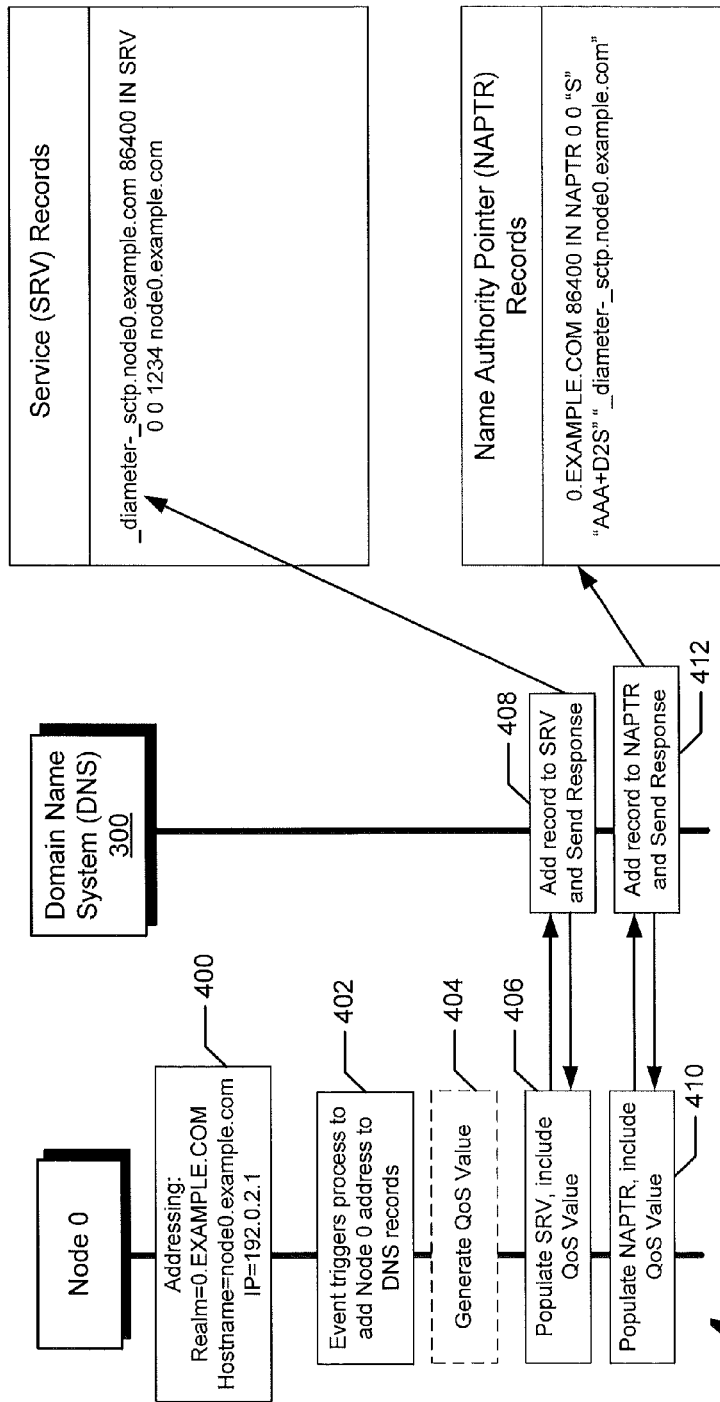
*Figure 3*
*Figure 4*

US 8,447,866 B2

NETWORK NODES THAT ESTABLISH SESSIONS USING EXISTING CONNECTIONS IDENTIFIED IN A CENTRAL DATABASE

TECHNICAL FIELD

The present disclosure is directed to network communications and, more particularly, to configuring communication connections among network nodes.

BACKGROUND

Credit control may involve mechanisms that interact in real-time with accounts associated with end users, and may control or monitor the charges related to service usage associated with those end users' accounts. For example, credit control may involve checking whether credit is available for a given account, reserving credit, deducting credit from the end user account when service is completed, and/or refunding reserved credit that is not used. Credit control has particular applicability in the provision of network services, such as, for example, provision of cellular airtime in a cellular radio network, provision of multimedia data in a wired or wireless network, etc. Credit control may be implemented by a charging system (e.g., a credit control server) that monitors and controls charges related to service usage of end users, and that grants and/or denies credit authorizations to those end users, thus, enabling network service delivery to the end users.

RFC 4006, entitled "Diameter Credit-Control Application" (DCCA), provides a specification that can be used to implement real-time credit-control for a variety of end user services such as network access services, Session Initiation Protocol (SIP) services, messaging services, and download services. RFC 4006 provides a general solution to real-time cost and credit-control in charging systems.

Introduction of shared account features to a cost charging system can complicate system operation and increase the overhead associated with updating connection and other information among network nodes of the charging system as the charging system grows. Shared accounts refer to an end user (consumer) who can utilize another end user's (provider) account. The user account records for the provider may or may not be located on the same network node as user account records for the consumer. Consequently, a network node having a user account record for a consumer may need to act as a proxy to retrieve a shared account record for the provider's account residing on another network node. Shared accounts therefore create a need for new message signaling pathways between network nodes, and may increase the amount of message signaling and response latency required to respond to a client credit inquiry relating to shared accounts.

SUMMARY

In some embodiments of the present invention, a first network node is configured to add information, which identifies connections established to other network nodes, to a central database. The central database forms a repository of information indicating connections between network nodes. The first network node responds to a request to establish a communication session to a second network node by interrogating the central database to identify any existing connections between the first and second network nodes. When an existing connection is identified, the first network node establishes the communication session with the second network node using the existing connection.

In some further embodiments, when a plurality of existing connections are identified that provide more than one available pathway between the first and second network nodes, the first network node may select among the existing connections for use in a communication session in response to quality of service values that are provided by the central database for those connections.

Although some embodiments are described herein in the context of a cost charging system, the invention is not limited thereto. Instead, various other embodiments of the present invention may be used with any type of system in which network nodes can update and interrogate a central database and can establish connections between the network nodes.

BRIEF DESCRIPTION OF THE DRAWINGS

The accompanying drawings, which are incorporated in and constitute a part of this specification, illustrate various embodiments of the invention. In the drawings:

FIG. 3 illustrates three network nodes that are configured to report their locations and connections to a Domain Name System (DNS) that includes a centralized database;

FIG. 4 illustrates a diagram of operations and associated message flows performed by network Node 0 to record its location in the Service (SRV) records and Name Authority Pointer (NAPTR) records of the DNS in FIG. 3;

DETAILED DESCRIPTION

The following detailed description of the invention refers to the accompanying drawings. The same reference numbers in different drawings may identify the same or similar elements. Also, the following detailed description does not limit the invention.

Figure 1:
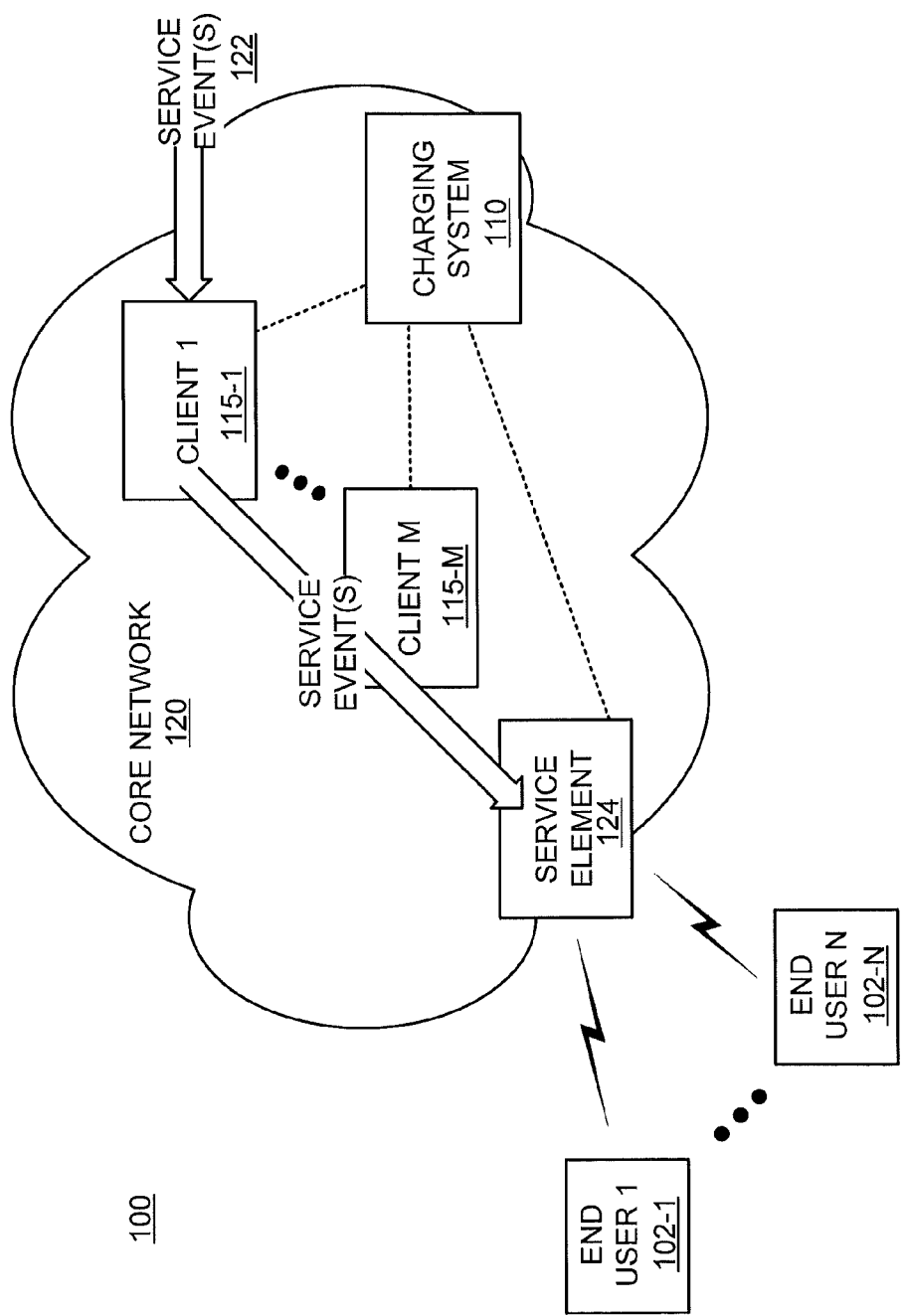
FIG. 1 illustrates an exemplary system that includes a charging system that controls charges related to network service usage of end users and which can operate according to some embodiments.

FIG. 1 illustrates an exemplary system 100 that includes a charging system 110 that controls charges related to network service usage of end users and which can operate according to some embodiments. Referring to FIG. 1, the system 100 may include end users 102-1 through 102-N connected to a core network 120. Network 120 may include clients 115-1 through 115-M that act as intermediate devices for forwarding a service event 122 associated with a network service to a service element 124, which provides the network service to end users 102-1 through 102-N. Each of clients 115-1 through 115-M may include a credit-control client (e.g., a Diameter Credit control client as specified in IETF RFC 4006) that interacts with the charging system 110. Each of clients 115-1 through 115-M may monitor usage of a service grant according to instructions provided by the charging system 110. Service element 124 may include a network node or device that provides a network service to end users 102-1 through 102-N. In some embodiments, service element 124 and a client (e.g., client 115-M) may be combined into a single network node or device, and service element 124/client 115-M may act as a credit-control client. Examples of service element 124 may include a network access server (NAS), a SIP proxy server, a Serving General Packet Radio Service (GPRS) Support Node (SGSN), a GPRS node, or an Application server, such as, for example, a messaging server, a content server, and/or a gaming server.

By way of non-limited example, a service event 122, intended for one or more of end users 102-1 through 102-N, may be received by client 115-1. Client 115-1 may forward a service event to client 115-M which, in turn, may forward the service event to service element 124 for provision of the associated service to one or more of end users 102-1 through 102-N. In conjunction with the forwarding of the service event, each of clients 112-1 through 112-M may send a charging request (e.g., a request for service units- not shown) to charging system 110 requesting authorization/denial of delivery of service event 122 to a respective one of end users 102-1 through 102-N. In response to each charging request, charging system 110 may send an authorization message that grants delivery of the service (e.g., delivery of a granted quota of service units) to the respective end user, or a denial message that denies delivery of the service to the respective end user based on performance of credit-control mechanisms.

Each of end users 102-1 through 102-N may include a cellular radiotelephone, a personal digital assistant (PDA), a Personal Communications Systems (PCS) terminal, a laptop computer, a desktop computer, a palmtop computer, or any other type of device or appliance that includes a communication transceiver that permits the device to communicate with other devices. A PCS terminal may combine a cellular radiotelephone with data processing, facsimile, and data communications capabilities. A PDA may include a radiotelephone, a pager, an Internet/intranet access device, a web browser, an organizer, calendars, and/or a global positioning system (GPS) receiver. A PCS or PDA may include a Session Initiation Protocol (SIP) User Agent (SIP UA) which may be used for SIP signaling in a Internet Protocol (IP) Multimedia Subsystem (IMS) domain.

Network 120 may include one or more networks of any type, including a local area network (LAN); a wide area network (WAN); a metropolitan area network (MAN); a telephone network, such as a Public Switched Telephone Network (PSTN) or a Public Land Mobile Network (PLMN); a satellite network; an intranet, the Internet; or a combination of these and/or other types of networks. The PLMN(s) may further include a packet-switched sub-network, such as, for example, General Packet Radio Service (GPRS), Cellular Digital Packet Data (CDPD), a Mobile Internet Protocol (IP) network, or an IMS network.

It will be appreciated that the components illustrated in FIG. 1 are shown by way of example. Other configurations with more components, fewer components, different components, or a different arrangement of components may be implemented. Moreover, in some embodiments, one or more components in FIG. 1 may perform one or more of the tasks described as being performed by one or more other components in FIG. 1.

Figure 2:
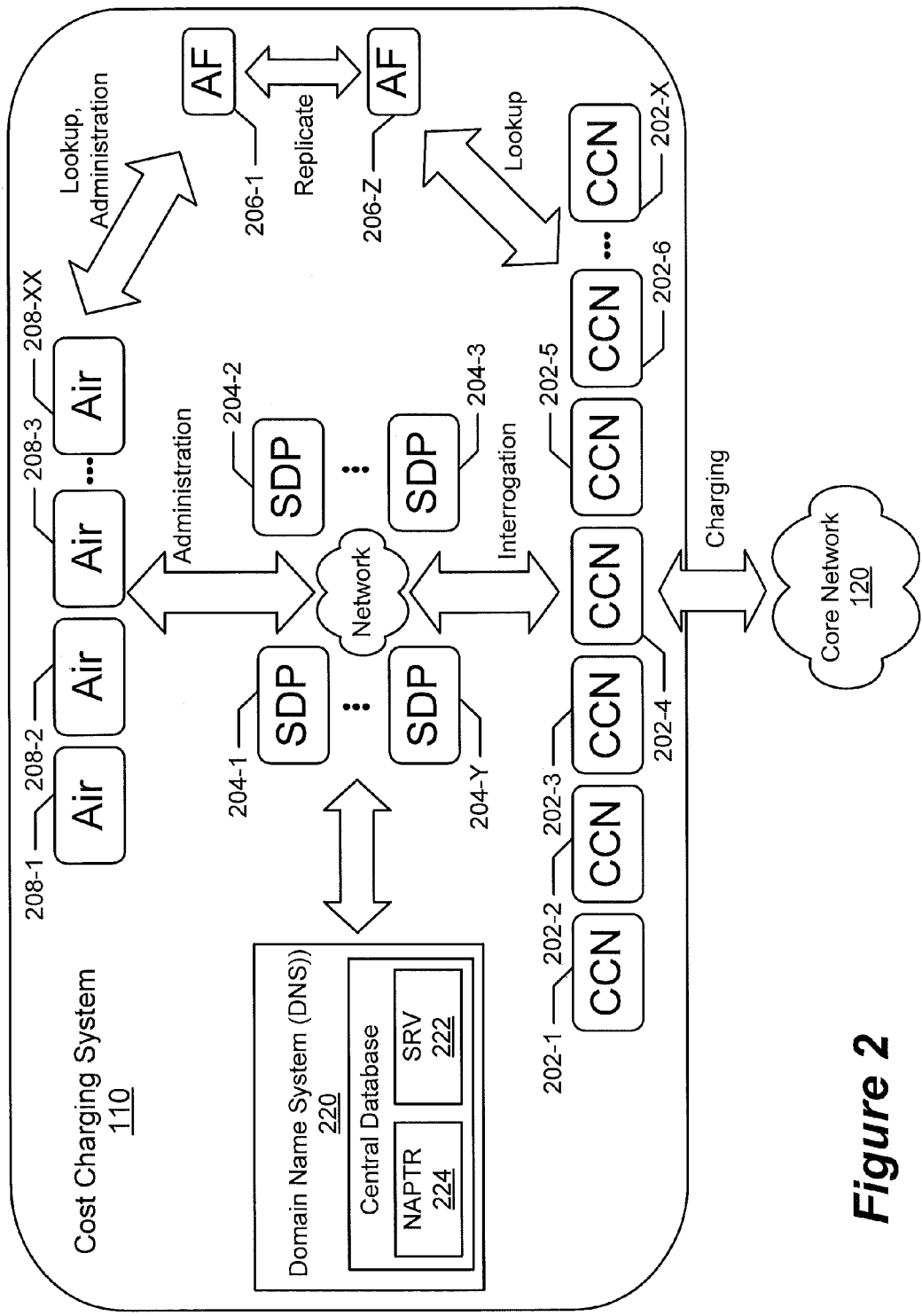
FIG. 2 illustrates the charging system of FIG. 1 including a centralized database that forms a repository of information indicating Service Data Point (SDP) locations and connections.

FIG. 2 illustrates an example configuration of the charging system 110 of FIG. 1 according to some embodiments. Referring to FIG. 2, the charging system 110 may include a plurality of Cost Control Nodes (CCN) 202-1 through 202-X that provide an interface to the clients 115-1 through 115-M to receive and respond to charging requests and monitor usage of services authorized to the end users 102-1 through 102-N. A plurality of Service Data Points (SDP) nodes 204-1 through 204-Y maintain user account records which are interrogated and updated by the CCNs 202-1 through 202-X (e.g., using Diameter protocol) responsive to charging requests received from various clients 115 for particular end users 102. The CCNs 202-1 through 202-X can interrogate Account Finder (AF) nodes 206-1 through 206-Z (e.g., using the Domain Name System (DNS) protocol) to identify which of the SDPs 204-1 through 204-Y contains (owns) user account records for a particular end user 102 associated with a service request from one or more of clients 115-1 through 115-M. The user account records in the SDPs 204-1 through 204-Y can be accessed and changed for administrative purposes (e.g., to reflect increased decreased user credit) via, for example, air node 208-1 through 208-XX The core network 120 may require that the charging system respond to a charging request from one of the clients 115 within, for example, 1 second. Accomplishing such responsiveness may be particularly challenging when the core network 120 includes a large number of clients 115 and/or when the charging system 110 includes a large number of CCNs 202 and/or SDPs 204 and, moreover, when communication connection paths between the CCNs 202 and SDPs 204 are locally setup and configured by each CCN 202 and SDP 204 (e.g., using Diameter protocol). As the number of SDPs 204 increases, each CCN needs to be able to locate and create new paths to the added SDPs 204.

Introduction of shared account features to the cost charging system 110 has further complicated system operation and increased the overhead associated with updating the CCNs 202 and SDPs 204 as the system 110 grows. Shared accounts refer to an end user (consumer) who can utilize another end user's (provider) account. The user account records for the provider may or may not be located on the same SDP 204 as user account records for the consumer. Consequently, one of the SDPs 204-1 through 204-Y having a user account record for a consumer may need to act as a proxy to retrieve a shared account record for the provider's account residing on another one of the SDPs 204-1 through 204-Y. Shared accounts therefore create a need for new message signaling pathways between SDPs, and may increase the amount of message signaling and response latency required to respond to a client credit inquiry relating to shared accounts.

To facilitate inter-node communication between SDPs 204, CCNs 202, and/or other network nodes, the charging system 110 includes a Domain Name System (DNS) 220 that includes a central database that forms a repository of information that identifies network node locations and connections that are presently existing between network nodes. For example, the DNS 220 may form a repository of information that identifies SDP locations and connections that are presently existing between the SDPs 204-1 through 204-Y. The DNS 220 can include Service (SRV) records 222 and Name Authority Pointer (NAPTR) records 224.

By way of example, when a new SDP is added to the cost charging system 110, the new SDP can add its location as a SRV record 222 and as a NAPTR record 224 in the DNS 220. When a first one of the SDPs 204-1 through 204-Y needs to communicate with a second one of the SDP 204-1 through 204-Y, the first SDP may interrogate the DNS 220 for any SRV records 222 identifying any existing connections to the second SDP. When an existing connection is identified, the first SDP may communicate to with the second SDP using the existing connection.

For example, a user account record stored on SDP 204-1 may contain a pointer to a shared user account record that is stored on SDP 204-Y. When a charging request is received by SDP 204-1 for the user account record, the SDP 204-1 can interrogate the DNS 220 requesting SRV records 222 identifying any existing connections between the SDPs 204-1 and 204-Y. The SDP 204-1 can respond to an existing connection between the SDPs 204-1 and 204-Y being identified by the DNS 220 by establishing a communication session to the SDP 204-Y using the existing connection to request and receive the shared user account record from the SDP 204-Y, The SDP 204-1 can then use the user account record to generate a response (e.g., authorization message) to the client 115 who generated the charging request.

The SDPs 204-1 through 204-Y may each be configured to generate a Quality of Service, QoS, value per established connection to another SDP 204 that indicates a level of QoS being provided by the SDP 204 for communications using that connection, and to communicate the generated QoS value to the DNS 220. As will be explained in further detail below, the QoS value may be stored in a weight field and/or a priority field of a SRV record 222 for the associated connection.

When a plurality of existing connections are identified between first and second SDPs (e.g., a direct connection and one or more indirect connections via other SDPs) responsive to the first SDP interrogating the DNS 220, the first SDP may use the received QoS value for each existing connection to decide whether to establish a communication session with the second SDP using any of the existing connections. For example, the first SDP may select an existing connection among the plurality of existing connections identified by the SRV records 222 which has the most acceptable QoS (e.g., the connection that will provide the highest level of QoS for the session).

Continuing with the above example, a second user account record on SDP 204-1 may contain a pointer to a shared user account record that is stored on SDP 204-2. When a charging request is received by SDP 204-1 for the second user account record, the SDP 204-1 can interrogate the DNS 220 requesting SRV records 222 identifying any existing connections between the SDPs 204-1 and 204-2. When the SRV records 222 identify that a direct connection between SDP 204-1 and SDP 204-2 exists and indirect connection between SDP 204-1 and SDP 204-2 via SDP 204-Y exists, the SDP 204-1 may compare the QoS values received with the SRV records 222 for each of the connections to select either direct connection or the indirect connection depending upon, for example, whichever connection will provide the highest QoS for the session the SDP 204-1 may then establish the session using the selected connection.

It will be appreciated that the components illustrated in FIG. 2 are shown by way of example. Other configurations with more components, fewer components, different components, or a different arrangement of components may be implemented. Moreover, in some embodiments, one or more components in FIG. 2 may perform one or more of the tasks described as being performed by one or more other components in FIG. 2.

These and various other embodiments will now be described below with regard to FIGS. 3-19. Although some embodiments are described herein in the context of a cost charging system, the invention is not limited thereto. Instead, various other embodiments of the present invention may be used with any type of system in which network nodes can update and interrogate a central database and can establish connections between the network nodes.

FIG. 3 illustrates three network nodes, network Node 0, network Node 1, and network Node N, that are configured to report their locations and connections to a DNS 300 that includes a centralized database. The DNS 300 may be configured as shown in FIG. 2 to include SRV records 222 and NAPTR records 224. The DNS 300 is external to the network Nodes 0,1,N and may be remotely located from the network Nodes 0,1,N with one or more broadband network connections supporting communications between the DNS 300 and each of the network Nodes 0,1,N.

FIG. 4 illustrates a diagram of operations and associated message flows performed by network Node 0 to record its location in the SRV records and NAPTR records of the DNS 300 in FIG. 3. Referring to FIG. 4, network Node 0 has an example address "Realm=0.EXAMPLE.COM, Hostname=node0.example.com, IP=192.021" (block 400). Responsive to initialization (e.g., power-up) or another event, a process is triggered (block 402) to cause network Node 0 to add its address as a record in the DNS 300. Network Node 0 may generate (block 404) a QoS value that indicates a level of quality of service that it can provide for communications to/from another network node, such as the communication data rate(s) it can support through its connection ports, its present loading, present queue status (e.g., remaining queue buffer size), typically data latency between data input and output, etc. Additionally, or alternatively network Node 0 may set its QoS value to encourage other nodes to either avoid connecting to network Node 0 or to request a connection to network Node 0.

Network Node 0 sends a SRV record message (block 406), which may include the QoS value, to the DNS 300, which responds by adding (block 408) the SRV record and sending an acknowledgment response to network Node 0. Network Node 0 also sends a NAPTR record message (block 410), which may include the QoS value, to the DNS 300, which responds by adding (block 412) the NAPTR record and sending an acknowledgment response to network Node 0.

Network Node 0 may record the QoS value in the weight field and/or in the priority field of the SRV record. Other network nodes (e.g., Node 1 and Node N) can then access the SRV record from the DNS 300 to obtain the QoS value recorded by Network Node 0. For example, as shown in FIG. 4, the example SRV record recites "_diameter-_sctp.node0.example.com 86400 IN SRV 0 0 1234 node0.example.com", where the segment "0 0" corresponds to the priority field and the weight field, respectively, both of those fields have been set to a value of 0. A low value in the priority field and/or the weight field may indicate a high QoS while a higher value may indicate a lower QoS, or vice versa.

Figure 5:
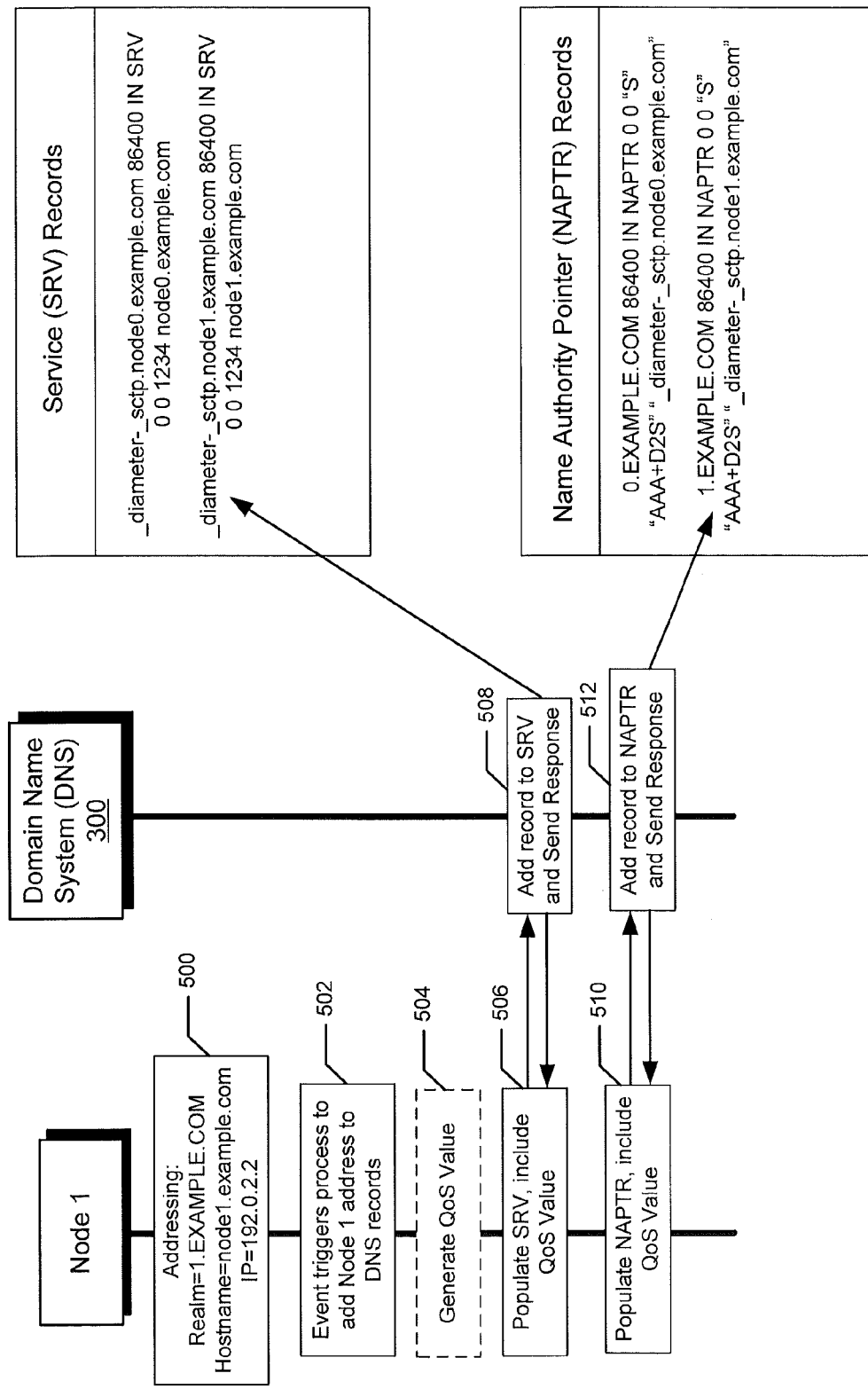
FIG. 5 illustrates a diagram of operations and associated message flows performed by network Node 1 to record its location in the SRV records and NAPTR records of the DNS in FIG. 3.

FIG. 5 illustrates a diagram of operations and associated message flows performed by network Node 1 to record its location in the SRV records and NAPTR records of the DNS 300 in FIG. 3. Network Node 1 may perform the same or similar operations to those described above for FIG. 4 for network Node 0 to add its location to the records of the DNS 300. Referring to FIG. 5, network Node 1 has an example address "Realm=1.EXAMPLE.COM, Hostname=node1.example.com, IP=192.0.2.1" (block 500). Responsive to initialization or another event, a process is triggered (block 502) to cause network Node 1 to add its address as a record in the DNS 300. Network Node 1 may generate (block 504) a QoS value that indicates a level of quality of service that it can provide for communications to/from another network node, such as the communication data rate(s) it can support through its connection ports, its present loading, present queue status (e.g., remaining queue buffer size), typically data latency between data input and output, etc. Additionally, or alternatively network Node 1 may set its QoS value to encourage other nodes to either avoid connecting to network Node 1 or to request a connection to network Node 1.

Network Node 1 sends a SRV record message (block 506), which may include the QoS value, to the DNS 300, which responds by adding (block 508) the SRV record and sending an acknowledgment response to network Node 1. Network Node 1 also sends a NAPTR record message (block 510), which may include the QoS value, to the DNS 300, which responds by adding (block 512) the NAPTR record and sending an acknowledgment response to network Node 1.

Figure 6:
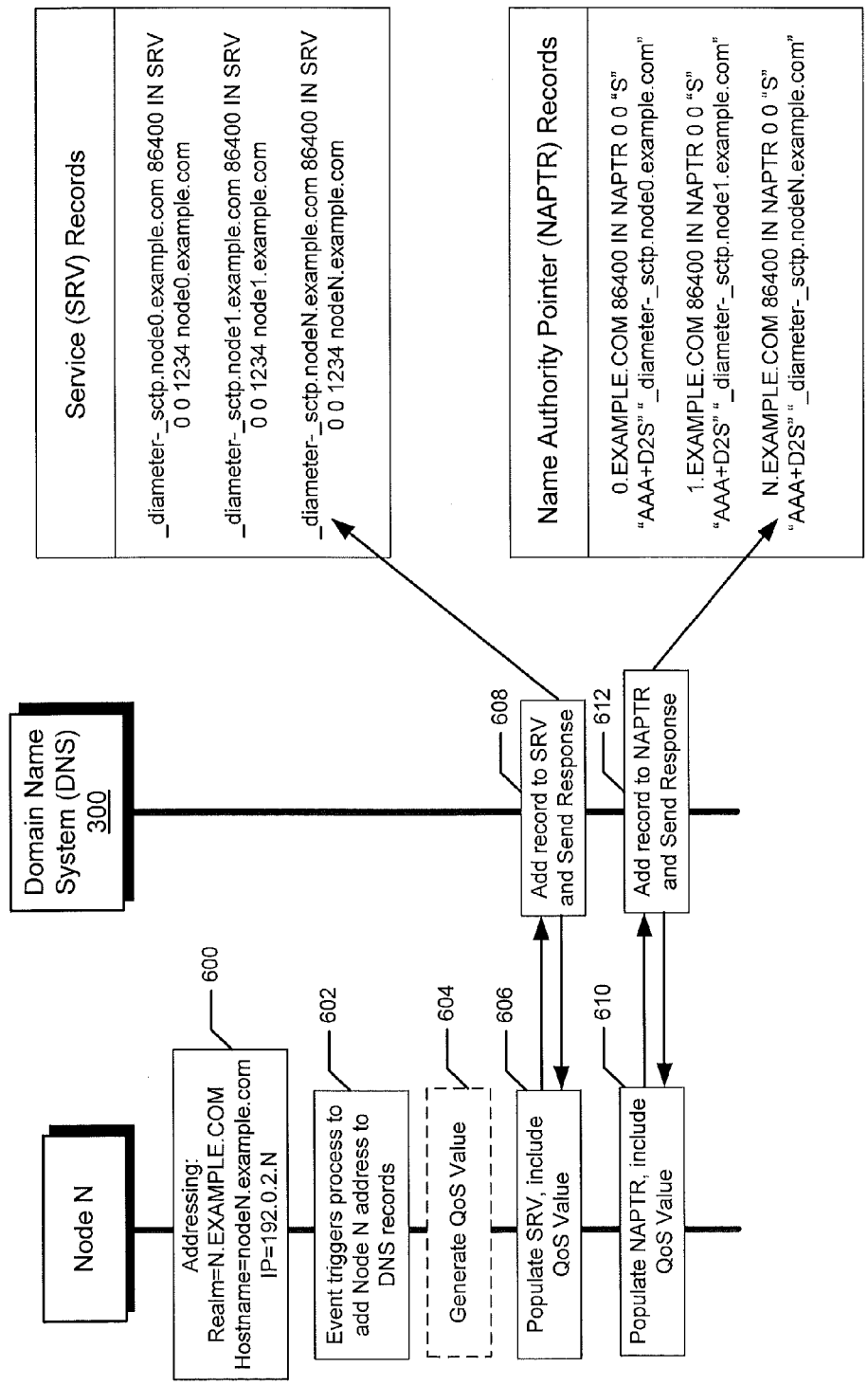
FIG. 6 illustrates a diagram of operations and associated message flows performed by network Node N to record its location in the SRV records and NAPTR records of the DNS in FIG. 3.

FIG. 6 illustrates a diagram of operations and associated message flows performed by network Node N to record its location in the SRV records and NAPTR records of the DNS 300 in FIG. 3. Network Node N may perform the same or similar operations to those described above for FIG. 4 for network Node 0 to add its location to the records of the DNS 300. Referring to FIG. 6, network Node N has an example address "Realm=N.EXAMPLE.COM, Hostname=nodeN.example.com, IP=192.0.2.N" (block 600). Responsive to initialization or another event, a process is triggered (block 602) to cause network Node N to add its address as a record in the DNS 300. Network Node N may generate (block 604) a QoS value using the same or similar operations as described above for block 404 of FIG. 4 and/or block 504 of FIG. 5. Network Node N sends a SRV record message (block 606), which may include the QoS value, to the DNS 300, which responds by adding (block 608) the SRV record and sending an acknowledgment response to network Node N. Network Node N also sends a NAPTR record message (block 610), which may include the QoS value, to the DNS 300, which responds by adding (block 612) the NAPTR record and sending an acknowledgment response to network Node N.

Figure 7:
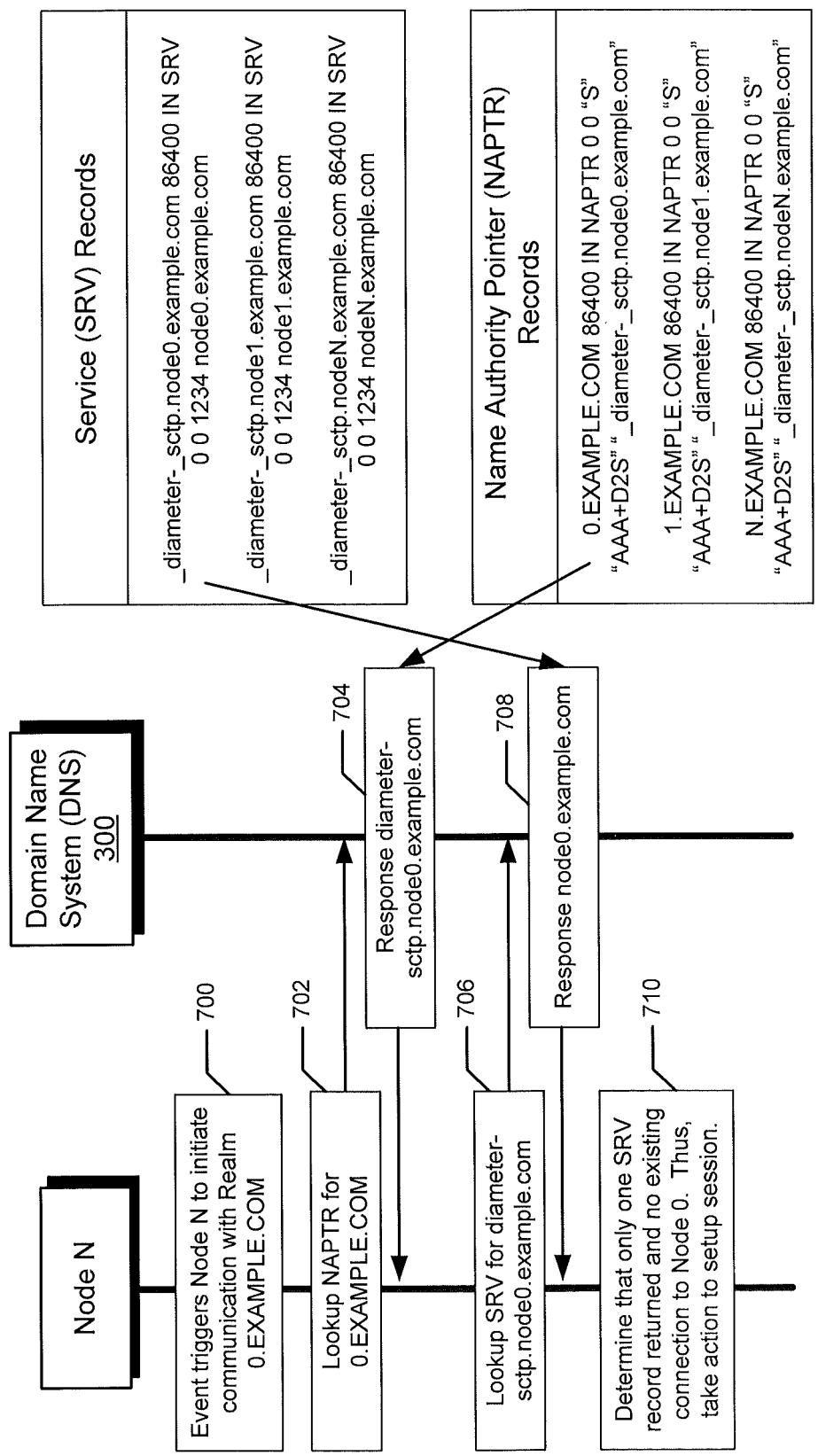
FIG. 7 illustrates a diagram of operations and associated message flows performed by network Node N to interrogate the DNS of FIG. 3 to identify any existing connections to network Node 0.

FIG. 7 illustrates a diagram of operations and associated message flows performed by network Node N responsive to needing to set up a session for communicating data traffic to network Node 0. Referring to FIG. 7, network Node N responds (block 700) to an event that triggers it to initiate communication with network Node 0 ("Realm 0.EXAMPLE.COM") by communicating (block 702) an interrogation message to the DNS 300 to look up the NAPTR record for network Node 0, DNS 300 performs a lookup and communicates (block 704) the corresponding NAPTR record ("diameter-sctp.node0.example.com") to network Node N. Network Node N then communicates (block 706) another interrogation message to the DNS 300 to look up the SRV record for network Node 0, DNS 300 performs a lookup and communicates (block 708) the corresponding SRV record ("_diameter-_sctp.node0.example.com 86400 IN SRV 0 0 1234 node0.example.com") to network Node N. Network Node N then determines (block 710) from the received SRV record that no existing connection is available from network Node N to network Node 0. Network Node N responds by initiating a process to setup a connection for the session, as will be explained below regarding FIG. 8.

Figure 8:
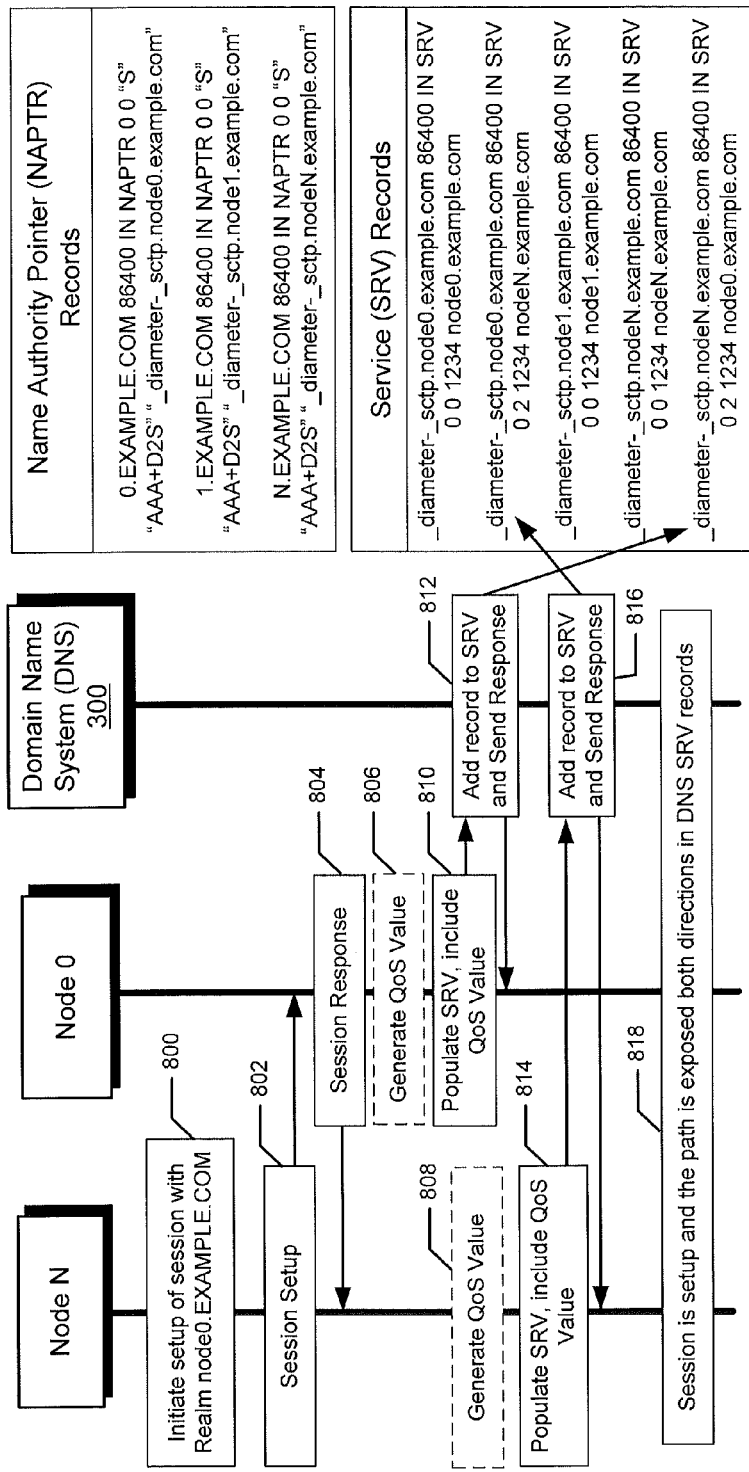
FIG. 8 illustrates a diagram of operations and associated message flows performed by network Nodes N and 0 to establish a connection therebetween and to add the connection as a SRV record in the DNS of FIG. 3.
Figure 9:
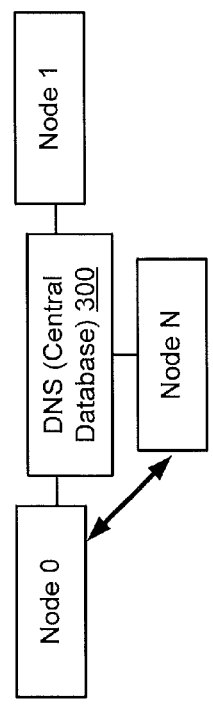
FIG. 9 illustrates the three network nodes of FIG. 3 with a new connection established between network Nodes N and 0.

FIG. 8 illustrates a diagram of operations and associated message flows performed by network Nodes N and 0 to establish a connection therebetween, to add the connection as a SRV record in the DNS of FIG. 3, and to use the connection for a communication session. Referring to FIG. 8, network Node N initiates setup (block 800) of a connection to network Node 0 for use in a communication session. Network node N communicates (block 802) a session setup message to network Node 0, which responds back to the network Node N with a session acknowledgment response message (block 804), which indicates that the session and associated connection have been setup. FIG. 9 illustrates the network Nodes 0,1,N of FIG. 3 with the new connection established between network Nodes N and 0.

Network nodes N and 0 may monitor (blocks 806 and 808) the session setup messages therebetween to generate QoS values that indicate a level of QoS being provided by the respective network nodes for communications using that connection. Network nodes N and 0 may alternatively or additionally monitor other messages communicated between Nodes N and 0, such as test messages, to determine the level of QoS be provided by the connection, and may continue to monitor the connection to generate updated QoS values for the connection. The QoS values may alternatively or additionally be defined using the same or similar operations as described above for block 404 of FIG. 4 and/or block 504 of FIG. 5.

Network node 0 can add information identifying the connection from itself to network Node N as a SRV record in the DNS 300 by communicating the information (block 810), which can include the generated QoS value (block 806) to the DNS 300. The DNS 300 responds by adding (block 812) a SRV record that identifies the connection. Similarly, Network node N can add information identifying the connection from itself to network Node 0 as a SRV record in the DNS 300 by communicating the information (block 814), which can include the generated QoS value (block 808) to the DNS 300. The DNS 300 responds by adding (block 816) a SRV record that identifies the connection. The QoS value may be stored in the SRV weight field and/or in the SRV priority field. In FIG. 8, the SRV records for Node N and Node 0 both recite "0 2", which corresponds to a priority value of "0" and a weight value of "2". The QoS value may be defined so that a lower value corresponds to a higher quality of service or vice versa. Although network Nodes N and 0 have been shown in FIG. 8 as adding information to the SRV (blocks 812 and 816) for their own respective service names, they may instead add information for each other's respective service names (i.e., the arrows between blocks 812 and 816 and the respectively identified SRV records may be swapped).

Network nodes N and 0 can then use the established connection to communicate data therebetween during the session. Because the connection between network Nodes N and 0 is identified in the SRV records of the DNS, other network nodes can discover the exposed connection and may chose to use that existing connection for another communication session by those nodes. The other network nodes may decide whether to use the existing connection in response to the QoS value that is recorded in the SRV records. For example, when a network node has a plurality of existing connections that can be alternatively used to communicate with another network node, the network node that is setting-up a communication session may select one of the existing connections that will provide the highest (best) QoS for the session.

Figure 10:
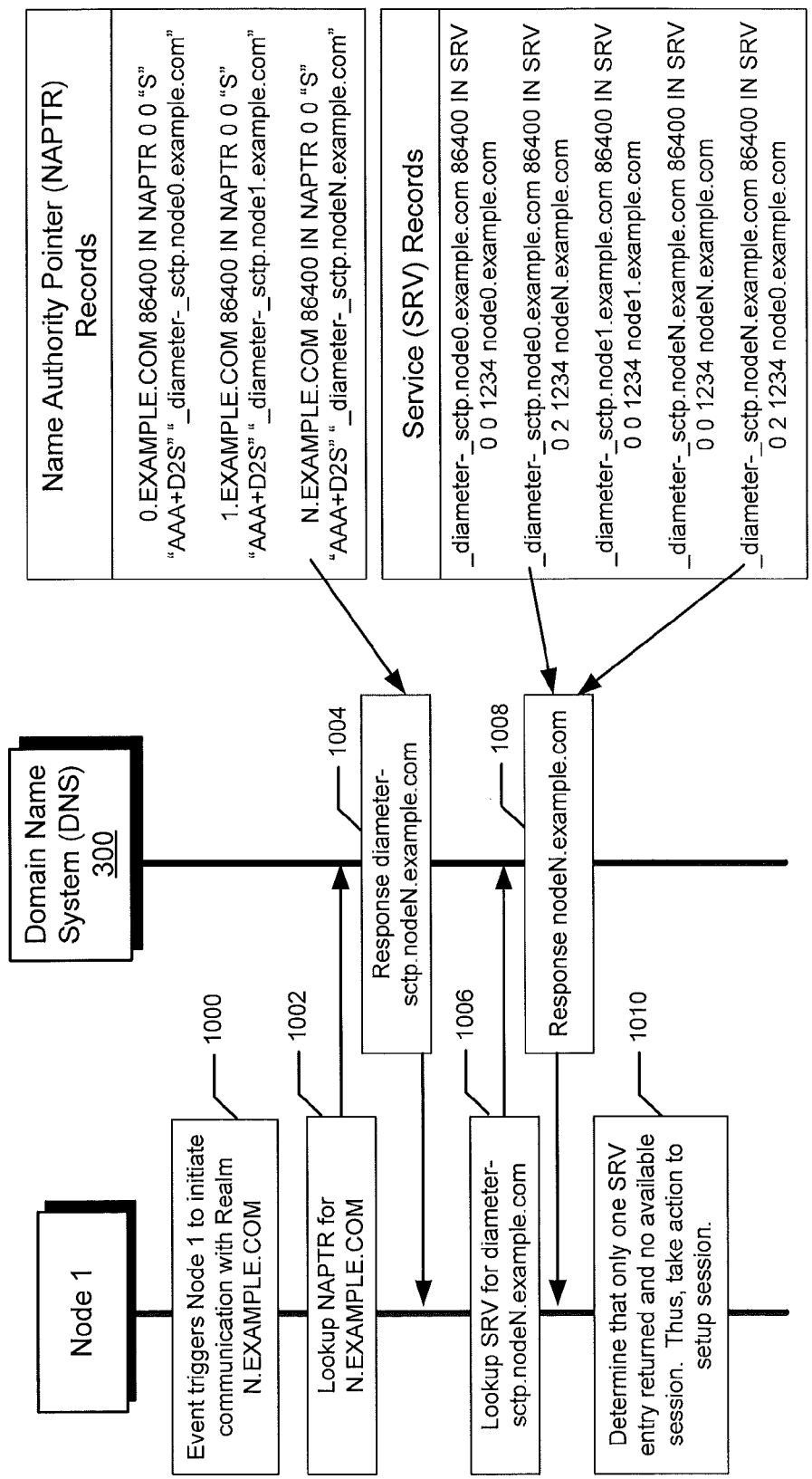
FIG. 10 illustrates a diagram of operations and associated message flows performed by network Node 1 to interrogate the DNS of FIG. 9 to identify any existing connections to Node N.

FIG. 10 illustrates a diagram of operations and associated message flows performed by network Node 1 responsive to needing to set up a session for communicating data traffic to network Node N. Referring to FIG. 10, network Node 1 responds (block 1000) to an event that triggers it to initiate communication with network Node N ("Realm N.EXAMPLE.COM") by communicating (block 1002) an interrogation message to the DNS 300 to look up the NAPTR record for network Node N. DNS 300 performs a lookup and communicates (block 1004) the corresponding NAPTR record ("diameter-sctp.nodeN.example.com") to network Node 1.

Network Node 1 then communicates (block 1006) another interrogation message to the DNS 300 to look up the SRV record for network Node N. DNS 300 performs a lookup and communicates (block 1008) the corresponding SRV records ("_diameter-_sctp.nodeN.example.com 86400 IN SRV 0 0 1234 nodeN.example.com" and "diameter-_sctp.nodeN.example.com 86400 IN SRV 0 2 1234 node0.example.com") to network Node 1. Network Node 1 then determines (block 1010) from the received SRV record that no existing connection is available from network Node 1 to network Node N. Network Node 1 responds by initiating a process to setup a connection for the session, as will be explained below regarding FIG. 11.

Figures 11, 12:
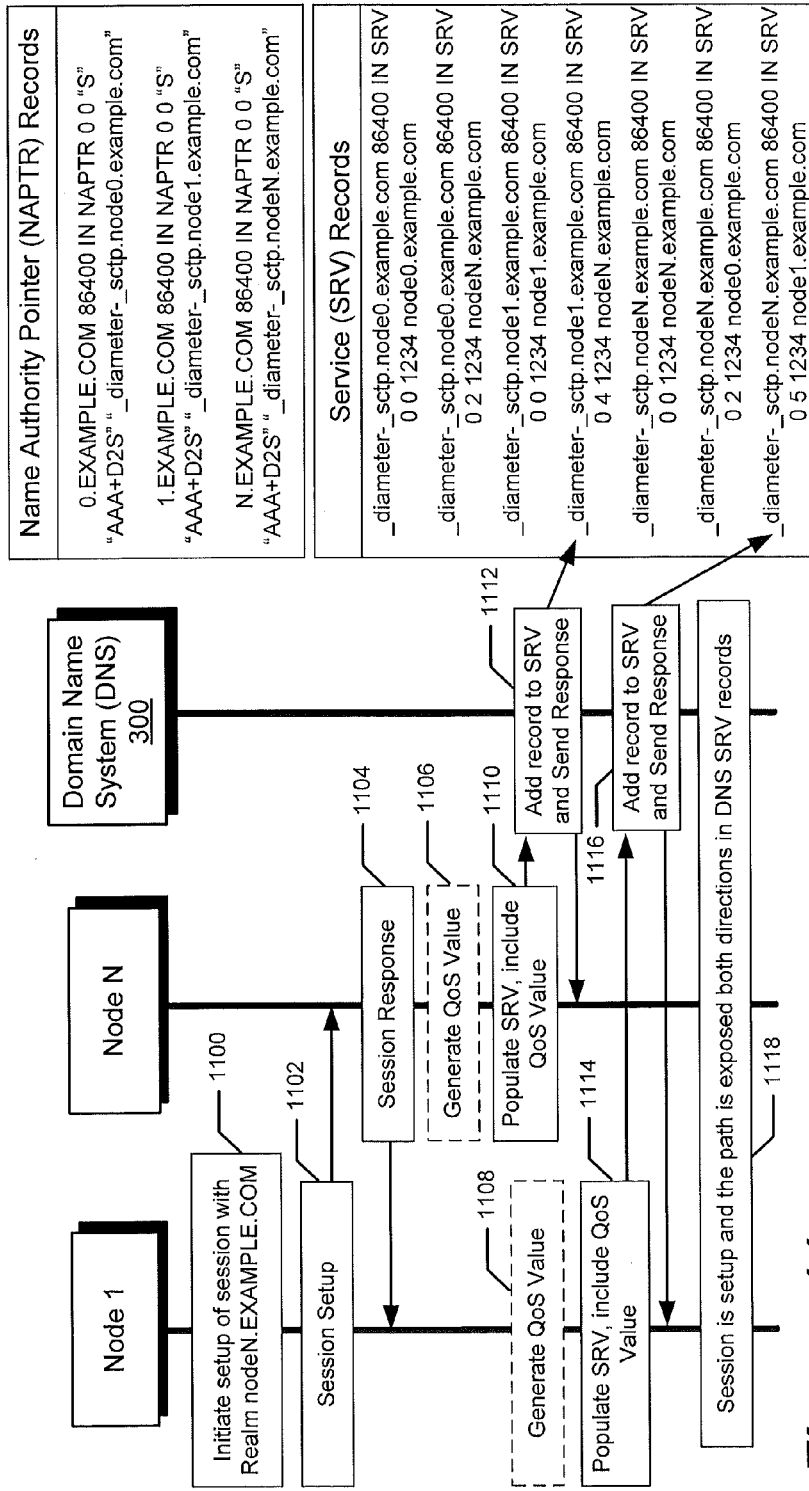
FIG. 11 illustrates a diagram of operations and associated message flows performed by network Nodes 1 and N to establish a connection therebetween and to add the connection as a SRV record in the DNS of FIG. 9.
FIG. 12 illustrates the three network nodes of FIG. 9 with a new connection established between network Nodes 1 and N.

FIG. 11 illustrates a diagram of operations and associated message flows performed by network Nodes 1 and N to establish a connection therebetween, to add the connection as a SRV record in the DNS of FIG. 9, and to use the connection for a communication session. Referring to FIG. 11, network Node 1 initiates setup (block 1100) of a connection to network Node N for use in a communication session. Network node 1 communicates (block 1102) a session setup message to network Node N, which responds back to the network Node 1 with a session acknowledgment response message (block 1104), which indicates that the session and associated connection have been setup. FIG. 12 illustrates the network Nodes 0,1,N of FIG. 9 with the new connection established between network Nodes 1 and N.

Network nodes 1 and N may monitor (blocks 1106 and 1108) the session setup messages therebetween to generate QoS values that indicate a level of QoS be provided by the respective network nodes for communications using that connection. Network nodes 1 and N may alternatively or additionally monitor other messages communicated between Nodes 1 and N, such as test messages, to determine the level of QoS be provided by the connection, and may continue to monitor the connection to generate updated QoS values for the connection. The QoS values may alternatively or additionally be defined (blocks 1106 and 1108) using the same or similar operations as described above for block 404 of FIG. 4 and/or block 504 of FIG. 5.

Network node N can add information identifying the connection from itself to network Node 1 as a SRV record in the DNS 300 by communicating the information (block 1110), which can include the generated QoS value (block 1106) to the DNS 300, The DNS 300 responds by adding (block 1112) a SRV record that identifies the connection. Similarly, Network node 1 can add information identifying the connection from itself to network Node N as a SRV record in the DNS 300 by communicating the information (block 1114), which can include the generated QoS value (block 1108) to the DNS 300. The DNS 300 responds by adding (block 1116) a SRV record that identifies the connection. In the example of FIG. 11, the DNS 300 added a SRV record for network Node 1 having a weight value of "4" and added a SRV record for network Node N with a weight value of "5", which can correspond to network Node 1 generating (block 1108) a QoS value of 4 and network Node N generating (block 1106) a QoS value of 5. Alternatively or additionally, the QoS values may be stored in the priority field of the SRV records, which are presently shown as "0" value.

Network nodes 1 and N can then use the established connection to communicate data therebetween during the session. Because the connection between network Nodes 1 and N is identified in the SRV records of the DNS, other network nodes can discover the exposed connection and may chose to use that existing connection for another communication session by those other nodes. The decision by another network node whether to use existing connection for a session may be made based on the QoS values recorded in the SRV records for those connections.

Figure 13:
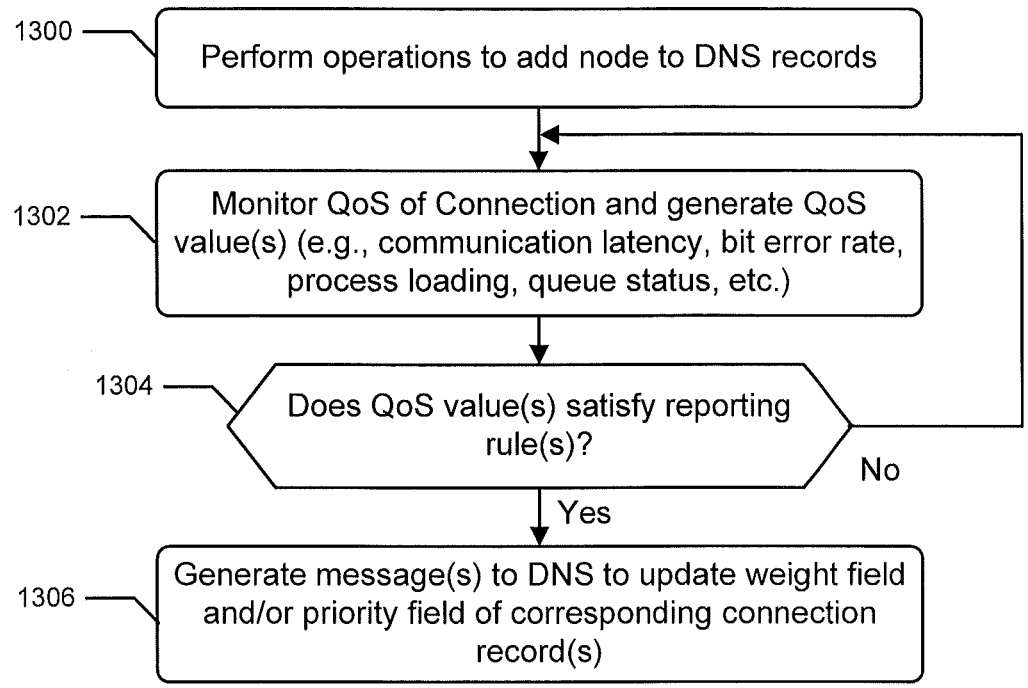
FIG. 13 is a flowchart of operations and methods that may be performed by each network node to monitor and report to the DNS a Quality of Service (QoS) value per established connection to another network node.

In addition to, or as an alterative to, generating QoS value (blocks 806,808 of FIG. 8 and blocks 1106, 1108 of FIG. 11) during setup of a connection to another network node, each of the network Nodes 0,1,N may repetitively monitor QoS for each connection they have to another network node and output a QoS report message to the DNS 300. FIG. 13 is a flowchart of operations and methods that may be performed by each network node to monitor and report their QoS value per established connection. Referring to FIG. 13, after performing operations to add a network node to the DNS records (block 1300), the network node can monitor (block 1302) QoS of each connection to another network node and generate QoS value(s), where the QoS values may indicate indication latency, bit error rate, process loading, queue status, or other metrics that may affect the QoS been provided by the network node for that connection. The QoS value(s) may alternatively or additionally be defined using the same or similar operations as described above for block 404 of FIG. 4 and/or block 504 of FIG. 5. When the generated QoS value(s) satisfy a reporting rule, such as when a present QoS value indicates (block 1304) that more than a threshold amount of QoS degradation has occurred from a previously reported value and/or upon expiration of a threshold elapsed time since a previously reported value, the network node generates (block 1306) a message to the DNS 300 to update the weight field, the priority field, and/or another field of the SRV record for the corresponding connection.

Figure 14:
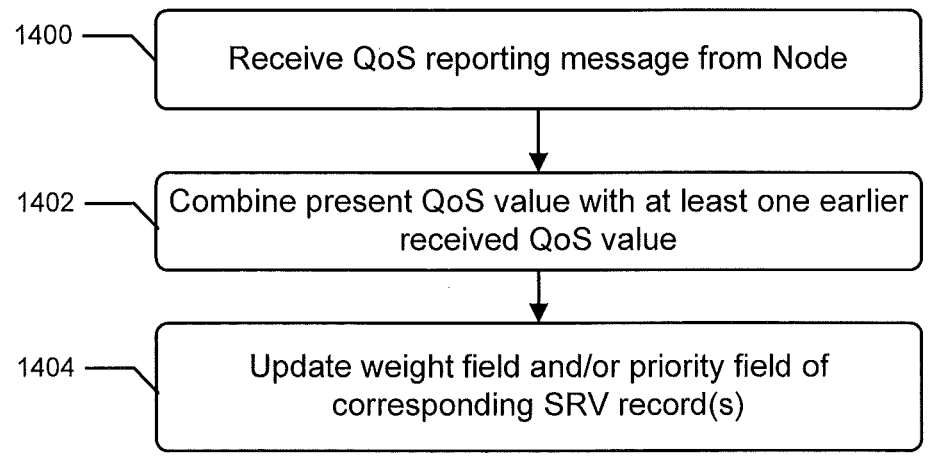
FIG. 14 is a flowchart of operations and methods that may be performed by the DNS to update SRV records to reflect QoS values reported by network nodes.

The DNS 300 may replace an entire SRV record in response to receiving a QoS reporting message (block 1306) from a network node. Alternatively, the DNS 300 may use the reported QoS value as an input to its own calculations for determining what QoS values to be recorded in its records. FIG. 14 is a flowchart of operations and methods that may be performed by the DNS to update SRV records to reflect QoS values reported by network nodes. Referring to FIG. 14, the DNS receives (block 1400) a QoS reporting message (from block 1306 of FIG. 13), and may combine (block 1402) the presently received QoS value with at least one other QoS value that has been received through one or more earlier QoS reporting messages (e.g., by calculating a weighted or normalized value from the individual QoS values reported in two or more QoS reporting messages) to generate a combined value that is recorded (block 1404) in the DNS 300, such as in the weight field and/or the priority field and a DNS record for the corresponding connection.

Figure 15:
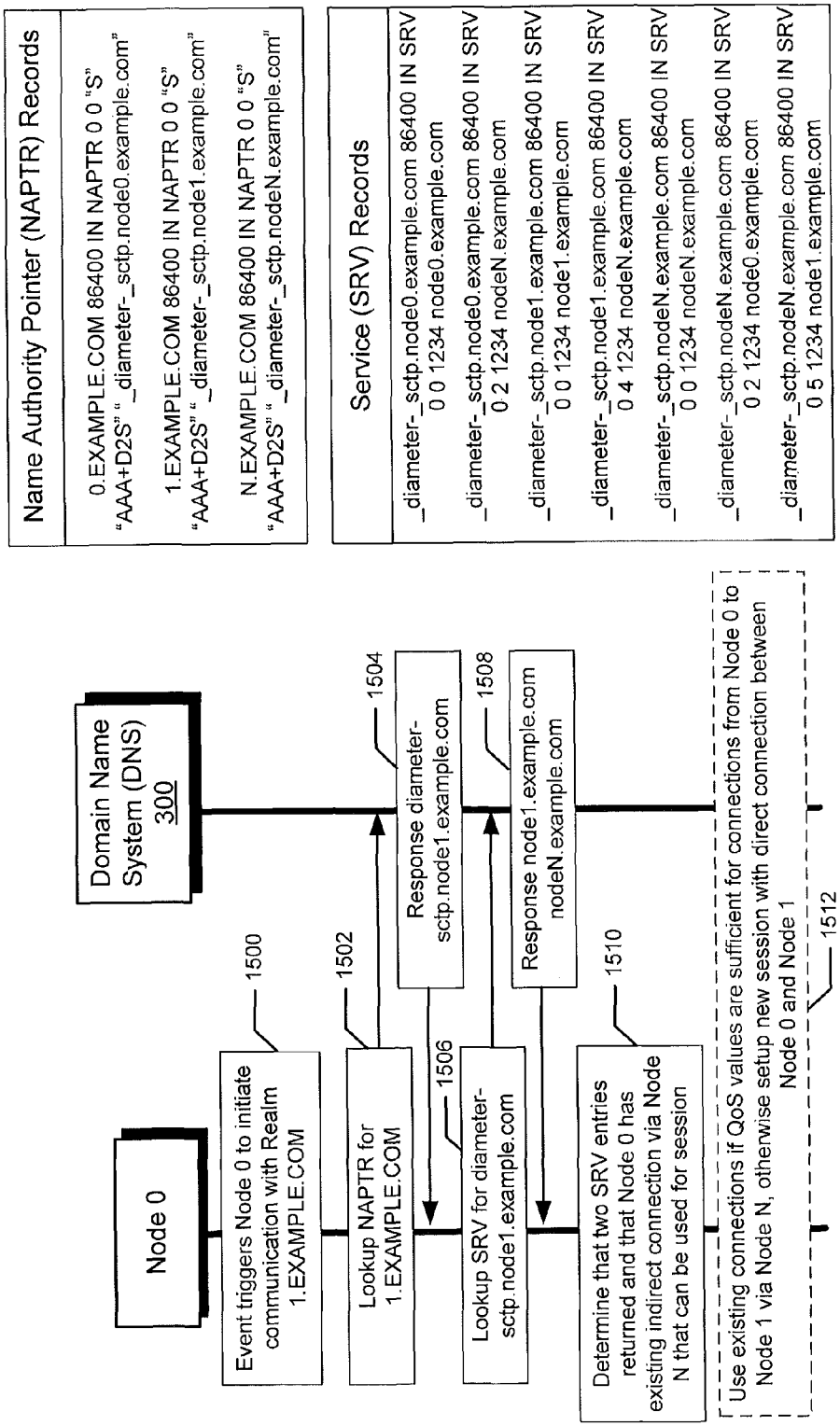
FIG. 15 illustrates a diagram of operations and associated message flows performed by network Node 0 to setup a new session to network Node 1 using an indirect connection between network Nodes 0 and 1 via network Node N identified by interrogating the DNS of FIG. 12.

FIG. 15 illustrates a diagram of operations and associated message flows performed by network Node 0 responsive to needing to set up a session for communicating data traffic to network Node 1. Referring to FIG. 15, network Node 0 responds (block 1500) to an event that triggers it to initiate communication with network Node 1 ("Realm 1.EXAMPLE.COM") by communicating (block 1502) an interrogation message to the DNS 300 to look up the NAPTR record for network Node 1. DNS 300 performs a lookup and communicates (block 1504) the corresponding NAPTR record ("diameter-sctp.node1.example.com") to network Node 0. Network Node 0 then communicates (block 1506) another interrogation message to the DNS 300 to look up the SRV record for network Node 1. DNS 300 performs a lookup and communicates (block 1508) the corresponding SRV record ("_diameter-_sctp.node1.example.com 86400 IN SRV 0 0 1234 nodeN.example.com") to network Node 0.

Network Node 0 then determines (block 1510) from the received SRV record that two SRV records have been returned and that network Node 0 has an existing indirect connection to network Node 1 via network Node N that can be used for the session. Network Node 0 uses the QoS values that are indicated (e.g., within the weight field and/or the priority field) in each received SRV record for the connections to decide (block 1512) whether to use the existing indirect connection for the session or to instead setup another connection (e.g., a direct connection) to network Node 1 to use for the connection. In the example of FIG. 15, Node 0 will receive the following QoS values from the DNS for the existing indirect connection through Node N: SRV weight of 2 from Node N to Node 0, SRV weight of 2 from Node 0 to Node N, SRV weight of 4 from Node N to Node 1, and SRV weight of 5 from Node 1 to Node N. The network Node 0 may choose to use the existing indirect connection when the received QoS values satisfy a QoS threshold for connection, and may respond to the received QoS values not satisfying the QoS threshold by initiating setup of another connection to network Node 1.

Figure 16:
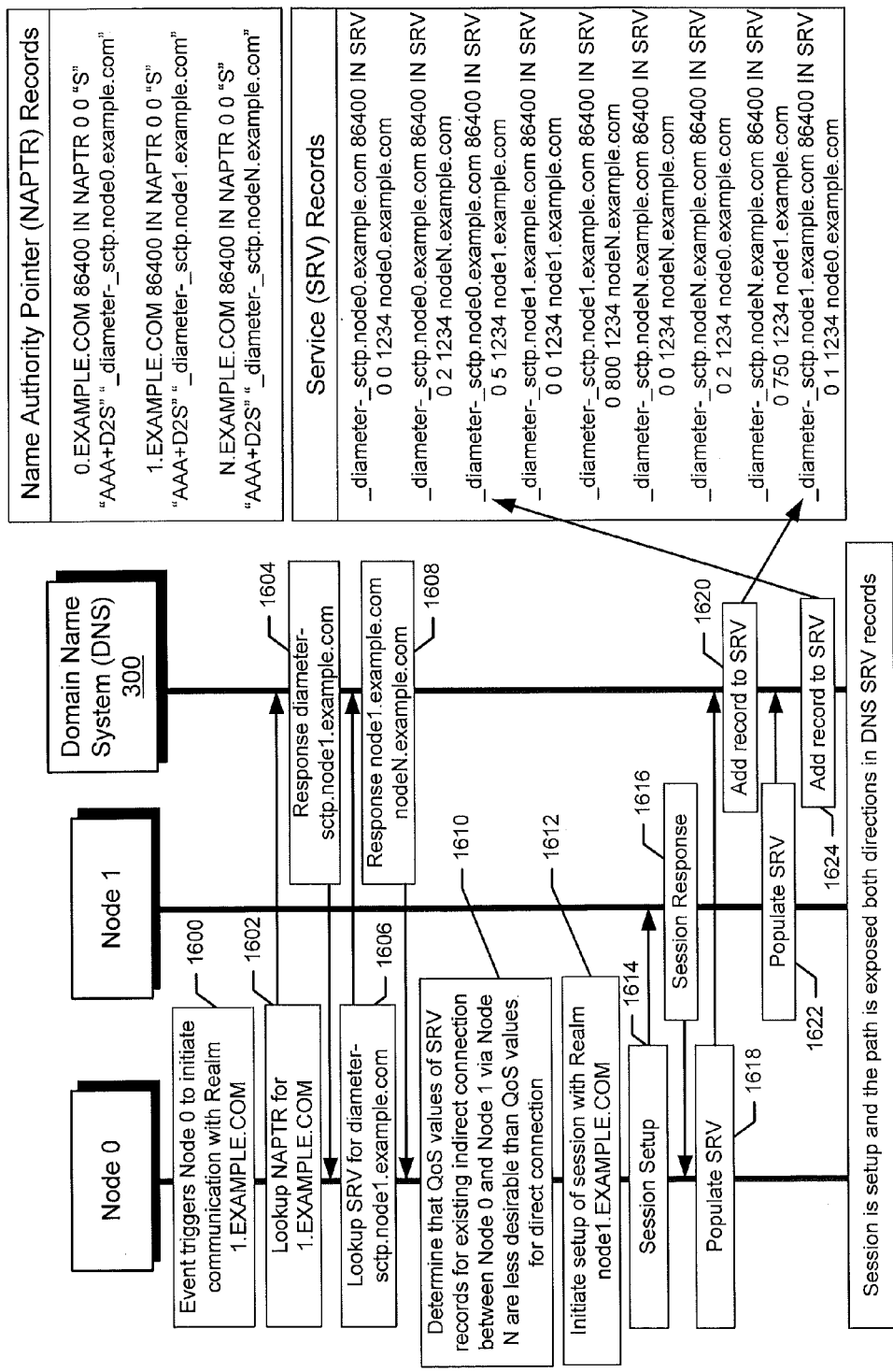
FIG. 16 illustrates a diagram of operations and associated message flows performed by network Nodes 0 and 1 to setup a new session with a direct connection therebetween responsive to interrogation of the DNS of FIG. 12 and received QoS values for the connections.

FIG. 16 illustrates a diagram of operations and associated message flows performed by network Nodes 0 and 1 to setup a new session and a new direct connection between them when an existing indirect connection between them does not provide a sufficient level of QoS for the session. Referring to FIG. 16, network Node 0 responds (block 1600) to an event that triggers it to initiate communication with network Node 1 ("Realm 1.EXAMPLE.COM") by communicating (block 1602) an interrogation message to the DNS 300 to look up the NAPTR record for network Node 1. DNS 300 performs a lookup and communicates (block 1604) the corresponding NAPTR record ("diameter-sctp.node1.example.com") to network Node 0, Network Node 0 then communicates (block 1606) another interrogation message to the DNS 300 to look up the SRV record for network Node 1. DNS 300 performs a lookup and communicates (block 1608) the corresponding SRV record ("_diameter-_sctp.node1.example.com 86400 IN SRV 0 0 1234 nodeN.example.com") to network Node 0.

Network Node 0 then determines (block 1610) from the received SRV record that two SRV records have been returned and that network Node 0 has an existing indirect connection to network Node 1 via network Node N that can be used for the session, Network Node 0 also determines from the QoS values are received for each connection identified in the SRV records that the existing indirect connection does not provide a sufficient level of QoS for the connection and, responsive to that decision, initiates setup (block 1612) of a new session having a direct connection to network Node 1.

For example, as described above with regard to FIGS. 13 and 14, Nodes 0, 1, and N may separately and independently monitor QoS for each connection they have to another network node and output a QoS report message to the DNS 300. In the example of FIG. 16, the QoS values for the existing indirection connection between Nodes 0 and 1 via Node N have substantially degraded since the snapshot of connection QoS values that are shown in FIG. 15. In FIG. 16, when network Node 0 interrogates (block 1606) the DNS for existing connections, the DNS will return the following QoS values from the DNS for the existing indirect connection through Node N: SRV weight of 2 from Node N to Node 0, SRV weight of 2 from Node 0 to Node N, SRV weight of 800 (was 4 in FIG. 15) from Node N to Node 1, and SRV weight of 750 (was 5 in FIG. 15) from Node 1 to Node N. Accordingly, the QoS for the connection between Nodes N and 1 has substantially degraded (assuming that lower SRV weights correspond to better QoS). Network Node 0 therefore determines that the existing connection between Nodes N and 1 does not provide a sufficient level of QoS for the connection and, responsive to that decision, initiates setup (block 1612) of a new session having a direct connection to network Node 1.

Figures 17, 18:
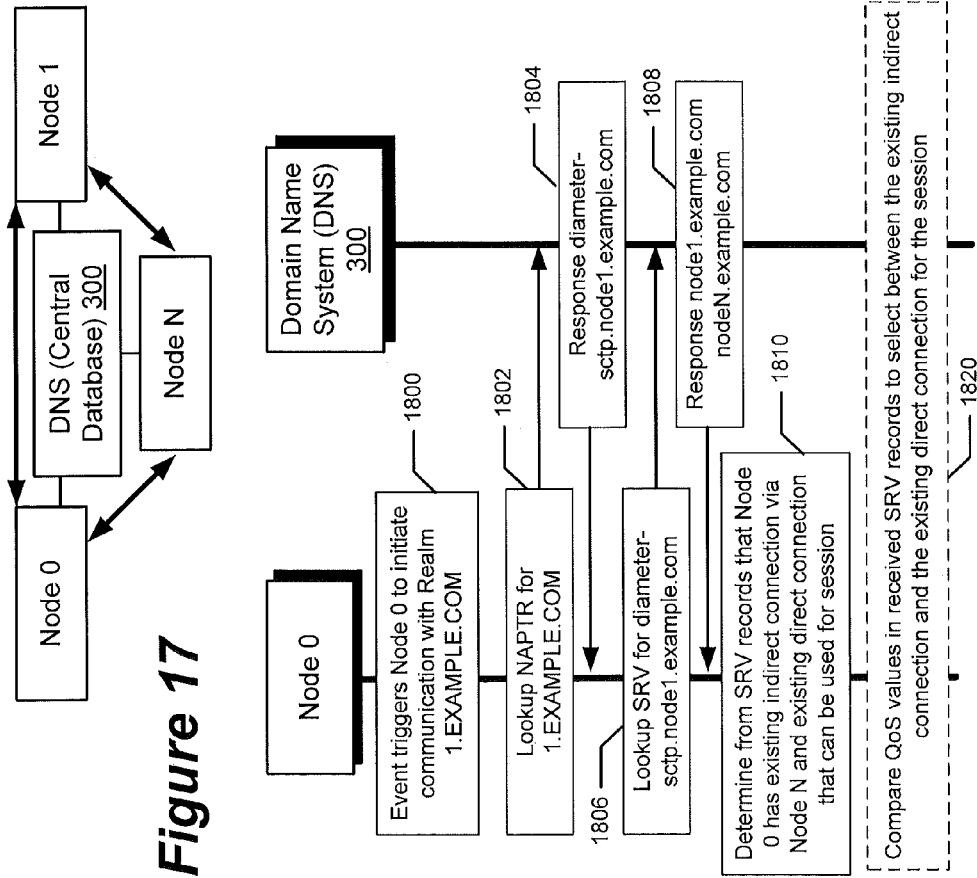
FIG. 17 illustrates the three network nodes of FIG. 12 with a new connection established between network Nodes 0 and 1.
FIG. 18 illustrates a diagram of operations and associated message flows performed by network Node 0 to decide between using a direct connection between network Nodes 0 and 1 or an indirect connection between network Nodes 0 and 1 via network Node N responsive to interrogation of the DNS records of FIG. 17.

Network node 0 communicates a session setup message (block 1614) to network Node 1, which responds with a session acknowledgment response message (block 1504), which indicates that the session and associated connection have been setup. FIG. 17 illustrates the network Nodes 0,1,N of FIG. 12 with the new connection established between network Nodes 0 and 1.

Network nodes 0 and 1 may monitor the session setup messages therebetween to generate QoS values that indicate a level of QoS be provided by the respective network nodes for communications using that connection. Network node 0 can add information identifying the connection from itself to network Node 1 as a SRV record in the DNS 300 by communicating the information (block 1618), which can include a generated QoS value (for the connection to network Node 1) to the DNS 300. The DNS 300 responds by adding (block 1620) a SRV record that identifies the connection. Similarly, Network node 1 can add information identifying the connection from itself to network Node 0 as a SRV record in the DNS 300 by communicating the information (block 1622), which can include a generated QoS value (for the connection to network Node 0) to the DNS 300. The DNS 300 responds by adding (block 1624) a SRV record that identifies the connection. In FIG. 16, the SRV records for the connection from Node 1 to Node 0 has a SRV weight of 5 and the connection from Node 0 to Node 1 has a SRV weight of 1.

Network nodes 0 and 1 can then use the established direct connection to communicate data therebetween during the session. Because the connection between network Nodes 0 and 1 is identified in the SRV records of the DNS, other network nodes can discover the exposed connection and may chose to use that existing connection for another communication session by those other nodes. The decision by another network node whether to use the existing connection for a session may be made based on the QoS values recorded in the SRV records for those connections.

FIG. 18 illustrates a diagram of operations and associated message flows performed by network Node 0 to decide between using the existing direct connection between network Nodes 0 and 1 or the existing indirect connection between network Nodes 0 and 1 via network Node N responsive to interrogation of the DNS records of FIG. 17. Referring to FIG. 18, network Node 0 responds (block 1800) to an event that triggers it to initiate a communication session with network Node 1 ("Realm 1.EXAMPLE.COM") by communicating (block 1802) an interrogation message to the DNS 300 to look up the NAPTR record for network Node 1. DNS 300 performs a lookup and communicates (block 1804) the corresponding NAPTR record ("diameter- sctp.node1.example. com") to network Node 0. Network Node 0 then communicates (block 1806) another interrogation message to the DNS 300 to look up the SRV record for network Node 1. DNS 300 performs a lookup and communicates (block 1808) the corresponding SRV records that identify existing connections to network Node 0 and network Node 1 and the QoS values associated with each of the existing connections.

The SRV records that are received by network Node 0 from the DNS 300 will include the following QoS values: SRV weight of 2 from Node N to Node 0, SRV weight of 5 from Node 1 to Node 0, SRV weight of 800 from Node N to Node 1, SRV weight of 2 from Node 0 to Node N, SRV weight of 750 (was 5 in FIG. 15) from Node 1 to Node N, and SRV weight of 1 from Node 0 to Node 1.

Network Node 0 then determines (block 1810) from the received SRV records that network Node 0 is directly connected to network Node 1 through a direct connection and that network Node 0 is also indirectly connected to network Node 1 via network Node N. Network Node 0 therefore compares (block 1820) the QoS values that were received in the SRV records from the DNS 300 for each of the existing connections to select one of the connections (i.e., the direct connection or the indirect connection) that has the most acceptable QoS (e.g., the connection that will provide the highest level of QoS for the session).

Using the example SRV records shown in FIG. 18, network Node 0 may select the direct connection to network Node 1 for use with the present session because the indirect connection via network Node N has relatively poor QoS values between Nodes N and 1 (i.e., SRV weights of 800 and 750). Thus, network Node 0 can use the existing direct connection to network Node 1 to provide a higher QoS for the communications than can presently be provided using the indirection connection via network Node N.

The SRV records for individual connections may expire and be removed from the central database if the corresponding connections are idle (not used for communication) for more than a threshold time. Thus, for example, if the connection between network Nodes 1 and N continues to have poor QoS and is not used by network Node 0 and/or other network nodes (e.g., Nodes N and 1) for a threshold time, then the SRV records that correspond to the connection between network Nodes 1 and N may be deleted from the DNS 300. Once deleted, a connection would need to be established again before direct communications can occur between network Nodes 1 and N. Once the direct connection between Nodes 1 and N is deleted from the SRV records, network Node 1 may still communicate with network Node N via network Node 0 (i.e., an indirect connection via Node 0). Similarly, the SRV records that correspond to the connection between network Nodes 0 and N and between Nodes 0 and 1 may be deleted from the DNS 300 if those connections are not used for communications sufficiently often (e.g., within defined threshold times) by network nodes.

Figure 19:
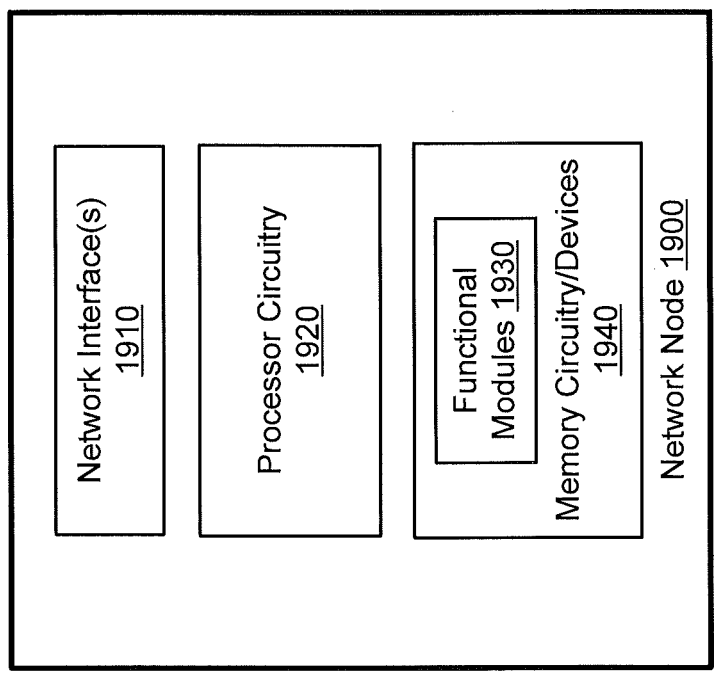
FIG. 19 is a block diagram of network node.

FIG. 19 illustrates a block diagram of a network node 1900 that is configured in accordance with some embodiments of the present invention. The network node 1900 may be used in each of the network Nodes 0 through N and/or the central database shown in FIG. 3 used in each of the SDPs 204-1 through 204-Y, each of the CCNs 202-1 through 202-X, and/ or used in other elements illustrated in any of the FIGS. 1-18. Referring to FIG. 19, the network node 1900 can include one or more network interfaces 1910, processor circuitry 1920, and memory circuitry/devices 1940 that contain functional modules 1930.

The processor circuitry 1920 may include one or more data processing circuits, such as a general purpose and/or special purpose processor (e.g., microprocessor and/or digital signal processor). The processor circuitry 1920 is configured to execute computer program instructions from the functional modules 1930 in the memory circuitry/devices 1940, described below as a computer readable medium, to perform some or all of the operations and methods that are described above for one or more of the embodiments, such as the embodiments of FIGS. 1-18. Accordingly, the processor circuitry 1920 can be configured by execution of the computer program instructions in the functional modules 1930 to carry out at least some of the functionality described herein to add information, which identifies connections established to other network nodes, to a central database that forms a repository of information indicating connections between network nodes, to respond to a request to establish a communication session to another network node by interrogating the central database to identify any existing connections between the two network nodes, and, when an existing connection is identified, to establish the communication session with other network node using the existing connection.

In the above explanation of exemplary embodiments of the invention, it is to be understood that, when a element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. In the description and appending drawings, like numbers refer to like elements throughout. Furthermore, "coupled", "connected", "responsive", or variants thereof as used herein may include wirelessly coupled, connected, or responsive. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation, Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s), These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present invention. All such variations and modifications are intended to be included herein within the scope of the present invention, as set forth in the following claims.

What is claimed is:

1. A first network node configured to add information, which identifies connections established to other network nodes, to a central database that forms a repository of information indicating connections between network nodes, to respond to a request to establish a communication session to a second network node by interrogating the central database to identify any existing connections between the first and second network nodes, and, when an existing connection is identified, to establish the communication session with the second network node using the existing connection, and further configured to generate a Quality of Service, QoS, value per established connection to another network node that indicates a level of QoS being provided by the first network node for communications using said connection, and to communicate the generated QoS value to the central database.

2. The first network node of claim 1, further configured to receive from the central database, responsive to the interrogation, at least one QoS value for each existing connection, and to use the received at least one QoS value for each existing connection to decide whether to establish the communication session between the first and second network nodes using any of the existing connections.

3. The first network node of claim 1, further configured to receive from the central database, responsive to the interrogation, at least one QoS value for each existing connection, and to respond to insufficient QoS being provided by the existing connections by communicating a session setup message to the second network node to initiate setup of a new connection between the first and second network nodes.

4. A first network node configured to add information, which identifies connections established to other network nodes, to a central database that forms a repository of information indicating connections between network nodes, to respond to a request to establish a communication session to a second network node by interrogating the central database to identify any existing connections between the first and second network nodes, and, when an existing connection is identified, to establish the communication session with the second network node using the existing connection, and further configured to:
respond to no existing connection being identified by the central database by communicating a session setup message to the second network node to initiate setup of a session and associated connection between the first and second network nodes; and
respond to a session acknowledgement response from the second network node indicating that the session and associated connection have been setup by adding the connection as a record in the central database.

5. A first network node configured to add information, which identifies connections established to other network nodes, to a central database that forms a repository of information indicating connections between network nodes, to respond to a request to establish a communication session to a second network node by interrogating the central database to identify any existing connections between the first and second network nodes, and, when an existing connection is identified, to establish the communication session with the second network node using the existing connection, and further configured to:
respond to another request to establish a communication session to a third network node by interrogating the central database to identify any existing connections between the first and third network nodes that are recorded in the central database; and
respond to an existing direct connection between the first and third network nodes being identified by the central database and an existing indirect connection between the first and third network nodes via the second network node being identified by the central database by selecting one of the existing direct connection and the existing indirect connection to use for the communication session to the third network node.

6. The first network node of claim 5, further configured to receive from the central database at least one Quality of Service, QoS, value for the existing direct connection and at least one QoS value for the existing indirect connection, and to use the received QoS values to select between the existing direct connection and the existing indirect connection for the communication session to the third network node.

7. A first network node configured to add information, which identifies connections established to other network nodes, to a central database that forms a repository of information indicating connections between network nodes, to respond to a request to establish a communication session to a second network node by interrogating the central database to identify any existing connections between the first and second network nodes, and, when an existing connection is identified, to establish the communication session with the second network node using the existing connection, and further configured to add a Service, SRV, record in a Domain Name System, DNS, that includes the central database to identify a new connection established to another network node.

8. The first network node of claim 7, further configured to:
respond to the request to establish a communication session to the second network node by interrogating the DNS for SRV records identifying any existing connections between the first and second network nodes;
respond to no existing connection being identified by the DNS by communicating a session setup message to the second network node to initiate setup of a session and associated connection between the first network node and the second network node; and
respond to a session acknowledgement response from the second network node indicating that the session and associated connection has been setup by adding a SRV record to the DNS that identifies the connection to the second network node.

9. The first network node of claim 7, further configured to:
respond to another request to establish a communication session to a third network node by interrogating the DNS for SRV records identifying any existing connections between the first and third network nodes; and
respond to an existing direct connection between the first and third network nodes being identified by the DNS and an existing indirect connection between the first and third network nodes via the second network node being identified by the DNS by selecting one of the existing direct connection and the existing indirect connection to use for the communication session to the third network node.

10. The first network node of claim 9, further configured to receive from the DNS at least one Quality of Service, QoS, value for the existing direct connection and at least one QoS value for the existing indirect connection, and to use the received QoS values to select between the existing direct connection and the existing indirect connection for the communication session to the third network node.

11. The first network node of claim 7, further configured to:
generate a Quality of Service, QoS, value, per established connection to another network node that indicates a level of QoS being provided by the first network node for communications using said connection, and to communicate the generated QoS value to the DNS for storage in a SRV record for said connection;
receive from the DNS, responsive to the interrogation, at least one SRV record for each existing connection, wherein each received SRV record contains at least one QoS value; and
compare the received at least one QoS value from each received SRV record to decide whether to establish the communication session between the first and second network nodes using any of the existing connections.

12. The first network node of claim 11, further configured to determine the at least one QoS value in response to a weight value and/or a priority value in each received SRV record.

13. The first network node of claim 7 comprises a Service Data Point, SDP, node containing a plurality of user account records for a charging system, a first one of the user account records containing a pointer to a shared user account record that is stored in the second network node, and the first network node is further configured to respond to a request for the first user account record by interrogating the DNS requesting SRV records identifying any existing connections between the first and second network nodes, and to respond to an existing connection between the first and second network nodes being identified by the DNS by using the existing connection to receive the shared user account record from the second network node.

14. The first network node of claim 13, wherein:
a second one of the user account records contains a pointer to a shared user account record that is stored in a third network node; and
the first network node is further configured to respond to a request for the second user account record by interrogating the DNS requesting SRV records identifying any existing connections between the first and third network nodes, and to respond to an existing direct connection between the first and third network nodes being identified by the DNS and an existing indirect connection between the first and third network nodes via the second network node being identified by the DNS by selecting one of the existing direct connection and the existing indirect connection to receive the shared user account record from the third network node.

15. A method comprising:
communicating information, which identifies a connection established between a first network node and another network node, from the first network node to a central database that forms a repository of information indicating connections between network nodes;
in response to a request at the first network node to establish a communication session to a second network node, communicating an interrogation message from the first network node to the central database to identify any existing connections between the first and second network nodes;
in response to an existing connection being identified, establishing the communication session between the first and second network nodes using the existing connection; and
communicating from the first network node to the central database a Quality of Service, QoS, value per established connection to another network node that indicates a level of QoS being provided by the first network node for communications using said connection.

16. The method of claim 15, further comprising:
receiving at the first network node from the central database, responsive to the interrogation message, at least one QoS value for each existing connection; and
deciding at the first network node whether to establish the communication session between the first and second network nodes using any of the existing connections in response to the received at least one QoS value for each existing connection.

17. A method comprising:
communicating information, which identifies a connection established between a first network node and another network node, from the first network node to a central database that forms a repository of information indicating connections between network nodes;
in response to a request at the first network node to establish a communication session to a second network node, communicating an interrogation message from the first network node to the central database to identify any existing connections between the first and second network nodes;
in response to an existing connection being identified, establishing the communication session between the first and second network nodes using the existing connection;
in response to another request at the first network node to establish a communication session to a third network node, communicating an interrogation message from the first network node to the central database to identify any existing connections between the first and third network nodes; and
in response to an existing direct connection between the first and third network nodes being identified by the central database and an existing indirect connection between the first and third network nodes via the second network node being identified by the central database, selecting one of the existing direct connection and the existing indirect connection to use for the communication session to the third network node.

18. The method of claim 17, further comprising:
receiving at the first network node from the central database at least one Quality of Service, QoS, value for the existing direct connection and at least one QoS value for the existing indirect connection; and
selecting between the existing direct connection and the existing indirect connection for the communication session to the third network node in response to the received QoS values.

19. A method comprising:
communicating information, which identifies a connection established between a first network node and another network node, from the first network node to a central database that forms a repository of information indicating connections between network nodes;
in response to a request at the first network node to establish a communication session to a second network node, communicating an interrogation message from the first network node to the central database to identify any existing connections between the first and second network nodes;
in response to an existing connection being identified, establishing the communication session between the first and second network nodes using the existing connection;
adding a Service, SRV, record in a Domain Name System, DNS, that includes the central database to identify a new connection established from the first network node to another network node.

20. The method of claim 19, further comprising:
in response to the request to establish a communication session to the second network node, communicating an interrogation message from the first network node to the DNS requesting SRV records identifying any existing connections between the first and second network nodes;
in response to no existing connection being identified by the DNS, communicating a session setup message from the first network node to the second network node to initiate setup of a session and associated connection between the first network node and the second network node; and
in response to a session acknowledgement response from the second network node indicating that the session and associated connection has been setup, communicating a message from the first network node to the DNS to add a SRV record that identifies the connection to the second network node, 21. The method of claim 19, further comprising:
in response to another request to establish a communication session to a third network node, communicating an interrogation message from the first network node to the DNS requesting SRV records identifying any existing connections between the first and third network nodes; and in response to receiving at the first network node from the DNS at least one Quality of Service, QoS, value for an existing direct connection between the first and third network nodes and at least one Quality of Service, QoS, value for an existing indirect connection between the first and third network nodes via the second network node, using the received QoS values to select one of the existing direct connection and the existing indirect connection to use for the communication session to the third network node.

22. The method of claim 19, further comprising:

generating at the first network node a Quality of Service, QoS, value, per established connection to another network node that indicates a level of QoS being provided by the first network node for communications using said connection;

communicating the generated QoS value to the DNS for storage in a SRV record for said connection;

receiving at the first network node from the DNS, responsive to the interrogation, at least one SRV record for each existing connection, each received SRV record containing at least one QoS value; and comparing the received at least one QoS value from each received SRV record to decide at the first network node whether to establish the communication session between the first and second network nodes using any of the existing connections.

23. The method of claim 19, wherein the first network node comprises a Service Data Point, SDP, node containing a plurality of user account records for a charging system, a first one of the user account records containing a pointer to a shared user account record that is stored in the second network node, the method further comprising:

in response to a request for the first user account record, communicating an interrogation message from the first network node to the DNS requesting SRV records identifying any existing connections between the first and second network nodes; and operating the first network node to use the existing connection to receive the shared user account record from the second network node in response to an existing connection between the first and second network nodes being identified by the DNS.

* * * * *

UNITED STATES PATENT AND TRADEMARK OFFICE
CERTIFICATE OF CORRECTION

PATENT NO. : 8,447,866 B2
APPLICATION NO. : 12/916877
DATED : May 21, 2013
INVENTOR(S) : Johansson It is certified that error appears in the above-identified patent and that said Letters Patent is hereby corrected as shown below:

In the Specification:

In Column 4, Line 45, delete "(CCN)" and insert -- (CCNs) --, therefor.

In Column 4, Line 49, delete "(SDP)" and insert -- (SDPs) --, therefor.

In Column 4, Line 63, delete "208-XX" and insert -- 208-XX. --, therefor.

In Column 5, Line 56, delete "204-Y," and insert -- 204-Y. --, therefor.

In Column 6, Line 27, delete "session the" and insert -- session, the --, therefor.

In Column 6, Line 60, delete "IP=192.021"" and insert -- IP=192.0.2.1" --, therefor.

In Column 7, Line 35, delete "IP=192.0.2.1"" and insert -- IP=192.0.2.2" --, therefor.

In Column 8, Line 21, delete "Node 0," and insert -- Node 0. --, therefor.

In Column 8, Line 26, delete "Node 0," and insert -- Node 0. --, therefor.

In Column 11, Line 34, delete "("diameter-sctp.nodel.example.com")" and insert -- ("diameter-sctp.node1.example.com") --, therefor.

In Column 11, Line 39, delete "("_diameter-_sctp.nodel.example.com" and insert -- ("_diameter-_sctp.node1.example.com --, therefor.

In Column 12, Line 6, delete "Node 0," and insert -- Node 0. --, therefor.

Signed and Sealed this
Twenty-ninth Day of April, 2014

Michelle K. Lee
*Deputy Director of the United States Patent and Trademark Office*

CERTIFICATE OF CORRECTION (continued)
U.S. Pat. No. 8,447,866 B2

In Column 12, Line 10, delete "("_diameter-_sctp.nodel.example.com" and insert -- ("_diameter-_sctp.node1.example.com --, therefor.

In Column 12, Line 16, delete "session," and insert -- session. --, therefor.

In Column 13, Line 25, delete "("diameter-sctp.nodel.example." and insert -- ("diameter-sctp.node1.example. --, therefor.

In Column 15, Line 30, delete "recitation," and insert -- recitation. --, therefor.

In Column 15, Line 51, delete "block(s)," and insert -- block(s). --, therefor.

In the Claims:

In Column 20, Line 60, in Claim 20, delete "node," and insert -- node. --, therefor.